(12) United States Patent
Lee et al.

(10) Patent No.: US 10,248,385 B1
(45) Date of Patent: Apr. 2, 2019

(54) EXTRACTING MOBILE APPLICATION WORKFLOW FROM DESIGN FILES

(71) Applicant: International Business Machines Corporation, Armonk, NY (US)

(72) Inventors: Kyungmin Lee, White Plains, NY (US); David M. Lubensky, Yorktown Heights, NY (US); Marco Pistoia, Yorktown Heights, NY (US); Stephen Wood, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/828,329

(22) Filed: Nov. 30, 2017

(51) Int. Cl.
| | | |
|---|---|---|
| *G06F 9/44* | (2018.01) | |
| *G06F 8/10* | (2018.01) | |
| *G06F 8/38* | (2018.01) | |
| *G06F 8/35* | (2018.01) | |
| *G06F 17/30* | (2006.01) | |

(52) U.S. Cl.
CPC .................. *G06F 8/10* (2013.01); *G06F 8/35* (2013.01); *G06F 8/38* (2013.01); *G06F 17/30604* (2013.01)

(58) Field of Classification Search
CPC ....................................................... G06F 8/10
USPC .................................................. 717/101–107
See application file for complete search history.

(56) References Cited

U.S. PATENT DOCUMENTS

| | | | | |
|---|---|---|---|---|
| 5,247,651 | A * | 9/1993 | Clarisse | G06F 8/10 703/13 |
| 6,269,474 | B1 * | 7/2001 | Price | G06F 8/70 717/104 |
| 6,895,409 | B2 * | 5/2005 | Uluakar | G06F 8/20 707/769 |
| 7,640,251 | B2 * | 12/2009 | Sundararajan | G06F 8/10 |
| 7,644,390 | B2 * | 1/2010 | Khodabandehloo | G06F 8/73 715/717 |
| 7,735,062 | B2 * | 6/2010 | de Seabra e Melo | G06F 9/451 717/120 |
| 7,966,356 | B2 * | 6/2011 | Sangal | G06F 8/20 707/829 |
| 8,185,871 | B2 * | 5/2012 | Nixon | G05B 23/0216 700/20 |
| 8,185,892 | B2 * | 5/2012 | Lucas | G06F 9/4488 717/178 |

(Continued)

OTHER PUBLICATIONS

Narendra, "Adaptive Workflow Management—An Integrated Approach and System Architecture", ACM, pp. 858-865, 2000 (Year: 2000).*

(Continued)

*Primary Examiner* — Anil Khatri
(74) *Attorney, Agent, or Firm* — Rahan Uddin, Esq.; McGinn IP Law Group, PLLC (57) ABSTRACT

A mobile application workflow extraction method, system, and computer program product include extracting functional elements from a design file to create a database of design screens, generating a flow graph of the design screens and the functional elements in the design file, creating a transition graph that details how to move from each of the design screens to another, and analyzing, for each of the design screens, a relatability of each design screen to a previously analyzed design screen in the database and generating a tag that represents a workflow.

17 Claims, 7 Drawing Sheets

(56) References Cited

U.S. PATENT DOCUMENTS

| | | | | |
|---|---|---|---|---|
| 8,332,278 | B2* | 12/2012 | Woolston | G06Q 20/10 |
| | | | | 705/26.1 |
| 8,370,798 | B2* | 2/2013 | Broadfoot | G06F 8/10 |
| | | | | 717/107 |
| 8,375,354 | B2 | 2/2013 | Shenfield et al. | |
| 8,566,782 | B2* | 10/2013 | Rigolet | G06F 9/4492 |
| | | | | 717/104 |
| 8,689,173 | B2* | 4/2014 | Elaasar | G06F 8/74 |
| | | | | 717/104 |
| 8,694,953 | B2* | 4/2014 | Khodabandehloo | G06F 8/20 |
| | | | | 715/717 |
| 8,732,656 | B2* | 5/2014 | Ahadian | G06F 8/10 |
| | | | | 717/106 |
| 8,904,243 | B2* | 12/2014 | Loimuneva | G06F 11/0787 |
| | | | | 714/38.1 |
| 9,092,277 | B2 | 7/2015 | Keys | |
| 9,851,949 | B2* | 12/2017 | Howard | G06F 8/10 |
| 2014/0317595 | A1 | 10/2014 | Kilby et al. | |

OTHER PUBLICATIONS

Baresi et al, "WIDE Workflow Development Methodology" ACM, pp. 19-28, 1999 (Year: 1999).*

Navathe, "Evolution of Data Modeling for Databases ", ACM, pp. 112-123, 1992 (Year: 1992).*

Weigand et al, " Comparative Logical and Physical Modeling in Two OODBMSs ", ACM, pp. 27-32, 1995 (Year: 1995).*

Albinsson et al, "High Precision Touch Screen Interaction", ACM, pp. 105-112, 2003 (Year: 2003).*

Chandra et al, "High Performance Many-to-Many Intranet Screen Sharing with DisplayCast", ACM, pp. 1-22, 2014 (Year: 2014).*

"Advanced Data Capture with Workflow"; Prismsofware; 2017.

Authors, et al. Disclosed Anonymously; "Mobile App Mash-up: Automatic View Creation using Data Mining" An IP.com Prior Art Database Technical Disclosure, IP.com No. IPCOM000217030D; Apr. 27, 2012.

Sunil Madhani, et al. "End-to-End severless, mobile-only based document processing" An IP.com Prior Art Database Technical Disclosure, IP.com No. IPCOM000228093D; Jun. 5, 2013; Copy Right: Intuit Inc.

Authors, et al. Disclosed Anonymously; "A way to make mobile applications work smarter as workflow" An IP.com Prior Art Database Technical Disclosure, IP.com No. IPC0M000244420D; Dec. 10, 2015.

Authors, et al. Disclosed Anonymously; "Approaches to improved Workflow Orchestration" An IP.com Prior Art Database Technical Disclosure, IP.com No. IPCOM000247031D;Jul. 27, 2016; Copy Right:2016 Schlumberger.

Mel, et al. "The NIST Definition of Cloud Computing". Recommendations of the National Institute of Standards and Technology. Nov. 16, 2015.

* cited by examiner

FIG. 2C did you remember to take your medicine? scenario medicine reminder (Industry: Aging, App: Elder Home)

EXTRACTING MOBILE APPLICATION WORKFLOW FROM DESIGN FILES

TECHNICAL FIELD

The present invention relates generally to a system, method, and computer program product for extracting software or application workflows for mobile devices, and more particularly, but not by way of limitation, to a system, method, and computer program product for extracting mobile application workflows by finding common patterns of function usage or through visual similarity or hints from the design file that elude to the expected use of the screens or hints from an application UI design file that elude to the expected use of the screens comprising the application.

BACKGROUND

Conventionally, techniques for application workflow creation for mobile devices mines event logs, interactions, etc. to discover processes (e.g., workflows) by determining the common process among various processes that were entered into the system. A drawback to these conventional approaches is that the conventional techniques require access to usage data. Although such data might be collected by the application client, it may not be available to the application developer.

SUMMARY

In an exemplary embodiment, the present invention can provide a computer-implemented workflow extraction method, the method including enabling a flow for processing design files of an application using Graphical User Interfaces (GUI) to allow automatic detection of workflows with a workflow being an expression within the application, as a sequence of screens (steps), for a task that a user of the application can carry out as part of the functionality that is provided by the application.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
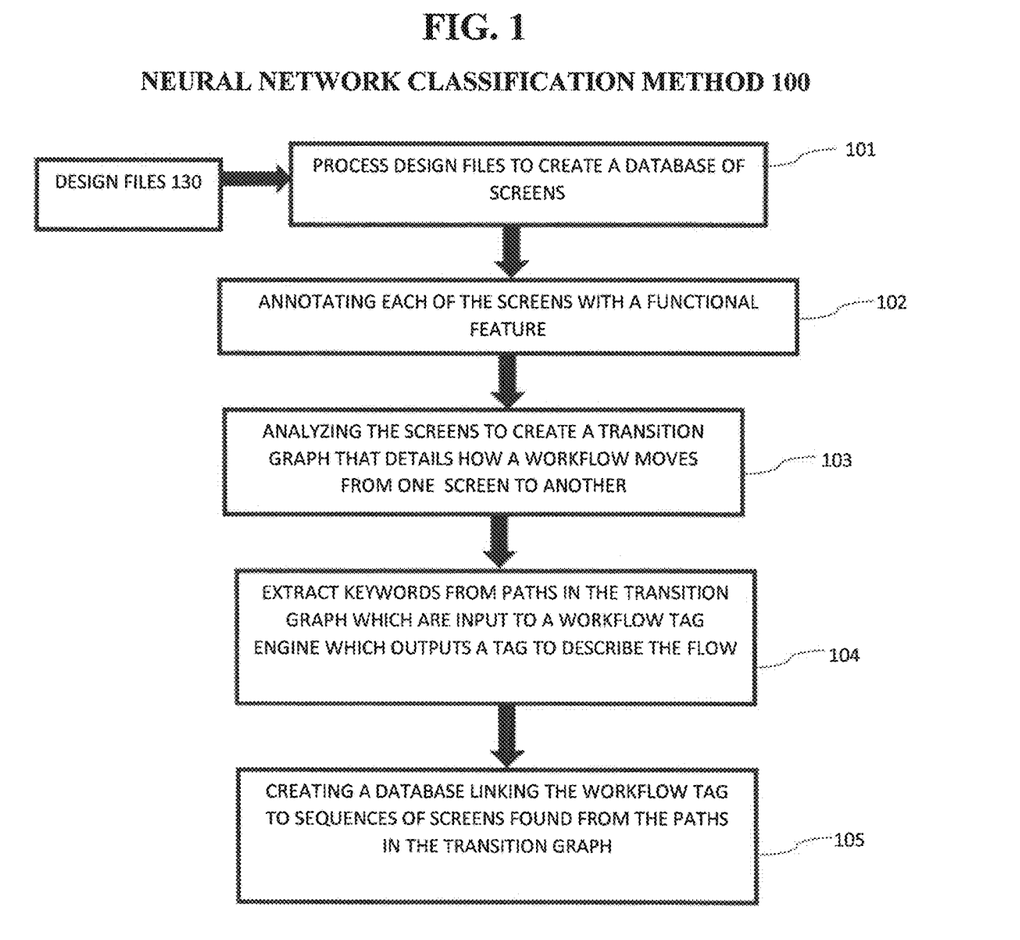
FIG. 1 exemplarily shows a high-level flow chart for a workflow extraction method 100 according to an embodiment of the present invention.

By way of introduction of the example depicted in FIG. 1, an embodiment of a workflow extraction method 100 according to the present invention can include various steps for processing design files of Application Graphical User Interfaces to allow automatic detection of workflows.

Figure 3:
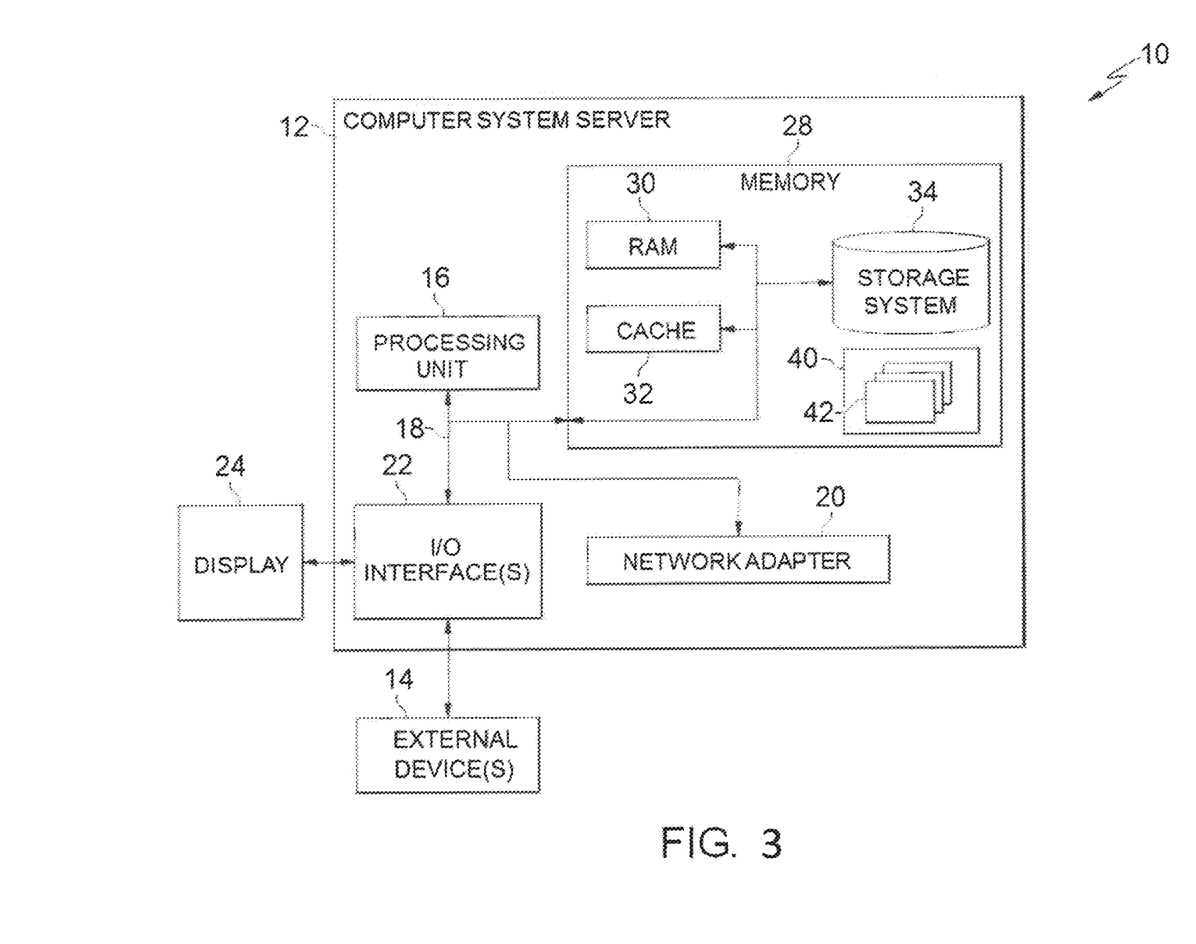
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Figure 2A:
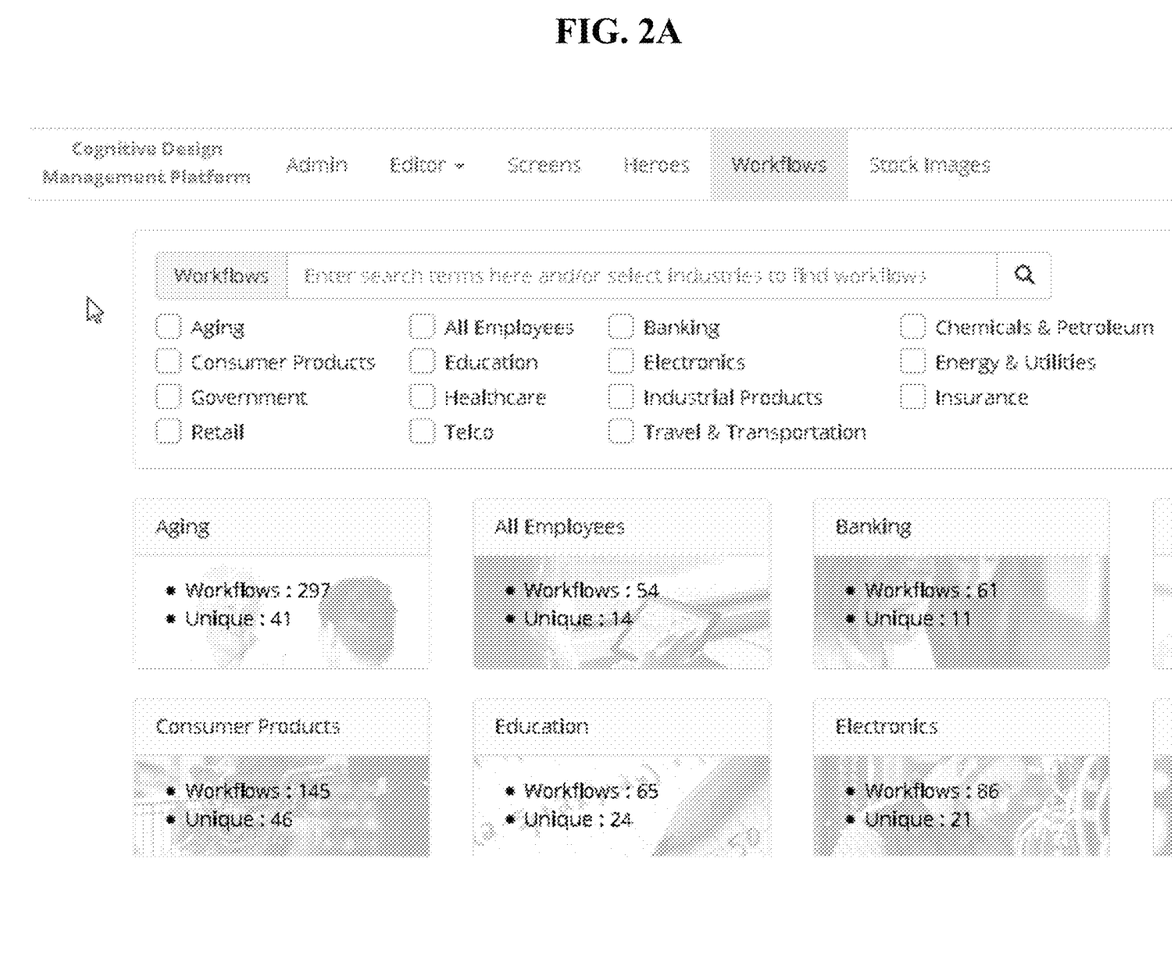
FIGS. 2A-2C exemplarily show a flow from the viewpoint of an end-user of this system as they search for and locate workflows that may be of help to them for the UI design of a new application.
Figure 2B:
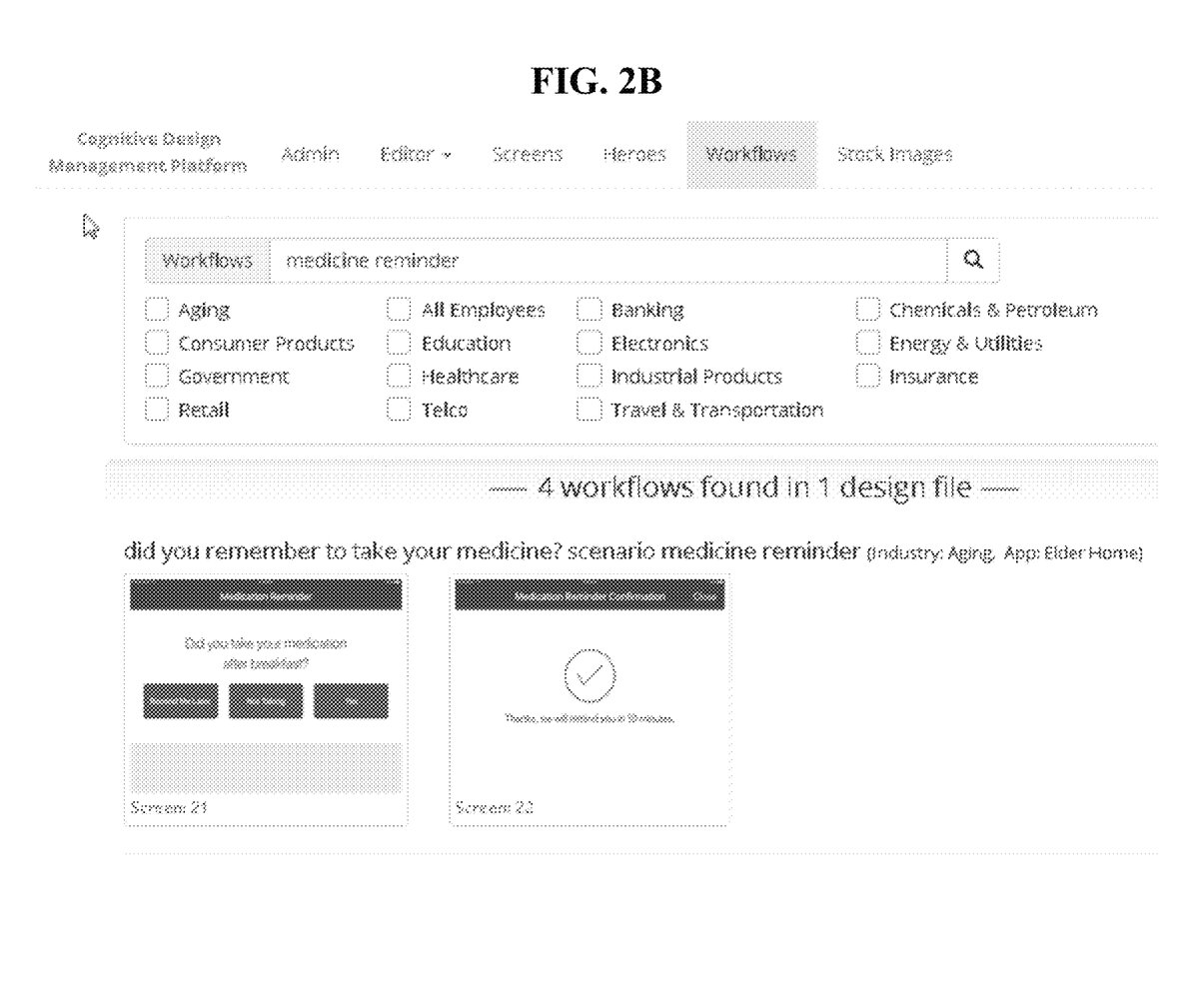
Figure 2C:
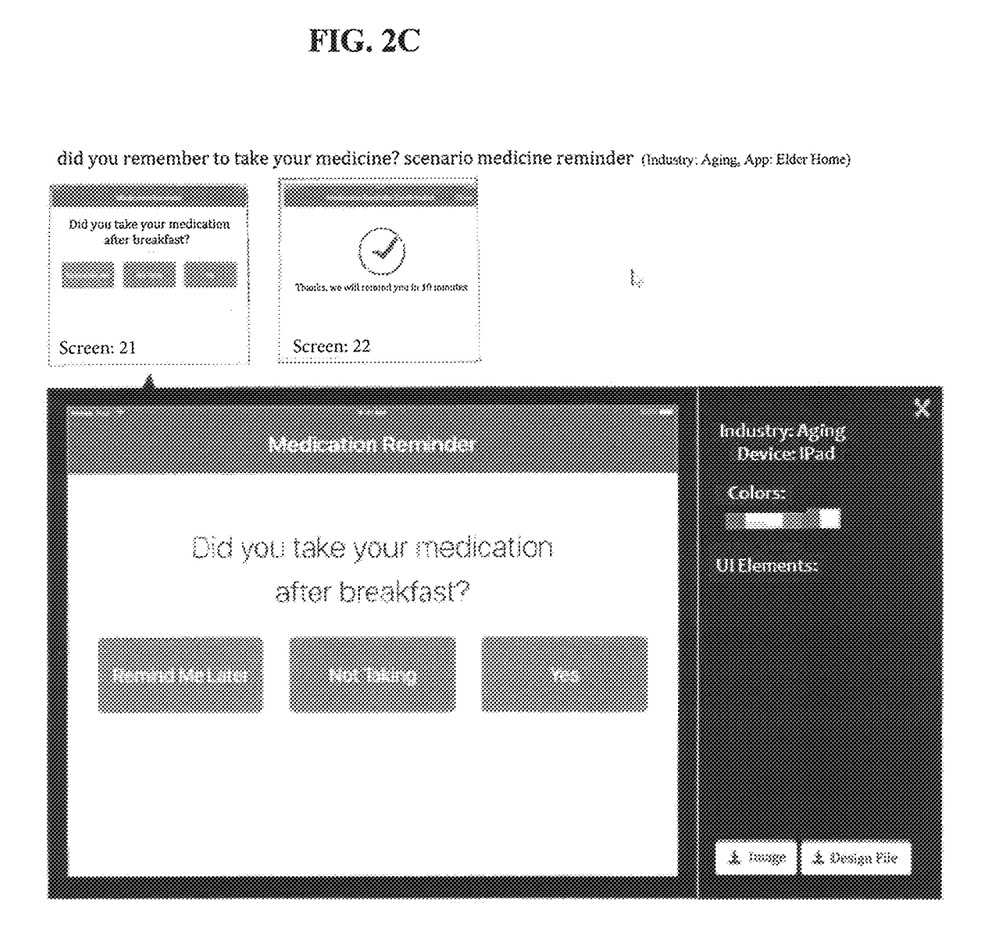

With reference now generally to FIGS. 1-2C, when a workflow design creator attempts to create a mobile application for a client (e.g., end-user), the set of workflows (i.e., user-stories) that the mobile application needs to contain is determined. Often, the client and the application developing companies iterate with each other to determine the workflows that need to be included in the application. These workflows encapsulate tasks, their intended benefits, and/or the reasons why the user will engage in those tasks. Some tasks may be small and remain contained within a single screen (User Interface (UI) page) of the application. Others may be more complex, requiring several different tasks/steps/sub-tasks and screens to complete. For instance, 'booking a restaurant meal with friends this week' is an example of a workflow. To create such a workflow in a mobile application, the exemplary workflow requires a screen that brings up contacts to select the friends and their available free times. Then, a screen is needed to look up restaurants, possibly taking into account any culinary preferences that one might find on the friends social media and the geographical vicinity to the friends' residences. Also, the screen can show nearby restaurants and ratings/reviews to narrow down the choice. Finally, a screen is needed to book the restaurant and notify the friends. Determining the exact workflow of each functionality of an application may require multiple iterations between the application-developing company and its client.

However, although each workflow is unique to each application, there is commonality between the various workflows of different applications that can be utilized (i.e., as extracted/created in method 100). For instance, almost every application has a 'Log in' workflow that is very similar across all the applications. The user enters their user ID and password to access the application. There is a screen to warn about a user ID and password mismatch, retrieve a forgotten password, retrieve a forgotten user ID, etc. The invention can extract the common workflow among different applications, and the invention can utilize such workflow as a reference when creating a new workflow for a new application. In one embodiment, realization of each workflow may be unique to each application. If the workflow itself is unique then it's a different workflow itself. Therefore, if a workflow represents the task (set of steps) a user carries out then it may be realized slightly differently, often the application carries an overall theme (colors, fonts, etc.) so it is very likely to differ in at least that aspect from any other given application with the same workflow (save for a given establishment might want to keep all their applications within a given theme etc. for branding and ease of use between applications keeping exact same screens for workflows that are re-used where it makes sense). Thus, although each workflow may be realized differently, to varying degrees, in different application there is commonality between the various workflow realizations of different applications that can be utilized.

Thus, with reference to FIG. 1, the method 100 can extract workflows from design files. The extracted workflows can be re-used to create new workflows for the client. By automatically detecting workflows and allowing their later retrieval via search for re-use, the invention offers an advantage over having to create an embodiment for the workflow from scratch when creating a new application. Furthermore, by extracting workflows from design screens, the method 100 enables rapid workflow prototyping that can significantly expedite the workflow finalization process, since the client can visually see how the workflow would look like in the final application within minutes of having discussed the application requirements with the application-development company. It should also be noted that the new workflow is automatically compliant with the design rules imposed by the application-development company or by the platform provider. This is because the new workflow will be based on existing, pre-approved workflows.

In step 101, a design file(s) 130 is uploaded/provided to the engine, which finds user interface (UI) elements and collections as basic functions. That is, the UI design files 130 are processed to, for example, create images of each screen (i.e., a database of screens) and optionally export as suitable machine-readable format for feature extraction. That is, the method 100 starts off with a collection of design files that can be mined and used to initialize the database. Subsequently, newly created design files can be uploaded/added to augment the database as desired. Further, the "engine" as referenced herein is part of the workflow extraction engine that forms the core of the system for the database creation.

In step 102, the screens are annotated with functional features for each screen. This may be done manually and/or by using image processing and/or natural language processing of text. In other words, each element of the screen is mapped according to its function (i.e., login feature, search feature, etc.).

In step 103, the screens are analyzed to create a transition graph that details how to move from one screen to another. In step 103, a flow graph of the design screens found in the design file is generated. Each screen represents a state in the state machine. A transition graph is created that details how to move from each screen to another (i.e., home screen-→login screen→user home page, etc.). Performing this process requires significant cognitive analysis of each individual screen. Each screen design is analyzed from a design file. For each screen, an analysis of how relateable that screen is to any previously seen screen is performed. For instance, if one sees a screen A with a map of various locations, and the screen B in the same design file that contains a zoomed-in map with detailed information of one location, then the method 100 infers that there exists a workflow from screen A to B by recognizing commonality between the two screens (screen A containing a map with a list of locations, and screen B containing a zoomed-in map with one of the locations listed in screen A). Step 103 utilizes its screen-relatable score, which is based on machine learning, to determine the closeness of two screens. And, the transition of screens is inferred purely using the design file, and the transition graph of the entire screens in the design file (e.g., which screen leads to which screen) is generated.

In step 104, paths in transition graph are analyzed to extract keywords which are input to a workflow tag engine. The workflow tag engine outputs a tag to describe the flow. That is, once the graph is generated, analysis is performed on each found path to automatically generate the tag that represents the workflow. For instance, a path from screen A (representing the ability to enter credit card information) to screen B (representing the ability to review information) to screen C (representing the ability to confirm payment) may be found. Each screen's represented keywords are input into the workflow tag generating engine, which in turn generates the potential workflow tag for the series of keywords that were input. In this example, it will output 'credit card payment workflow'. The workflow tag engine is trained from all the known workflows.

In step 105, a database is created linking the tags to the sequences of screens found from the paths in the transition graph with this workflow-extraction engine such that a designer can now search for workflows based on entering a user story and/or tags. The designer can browse the results and choose to incorporate the workflow design or parts thereof into the new application, or just gain inspiration from seeing how past workflows have been represented and integrated together.

Thus, the method 100 can enable a flow for processing design files of an application using Graphical User Interfaces (GUI) to allow automatic detection of workflows with a workflow being an expression within the application, as a sequence of screens (steps), for a task that a user of the application can carry out as part of the functionality that is provided by the application. Examples of such workflow can include tasks such as such as login, payment submission for an item purchased, user account creation, planning and scheduling an activity etc. A sequence of screens can minimally be a single screen for a simple task. The method 100 can create a database such that an application can then be created to allow designers to easily navigate the resultant database and search for workflows. As these are higher level semantic behaviors of the application the designer may be most interested in how the workflow was designed over the set of screens and the UI control therein with a view to re-using it or adapting it to their specific needs.

FIGS. 2A-2C exemplarily depict an output of the method 100. FIGS. 2A-2C depict screenshots of such an application that allows a search of workflows extracted from design files follows. The design files have been logically grouped by the industry for which the application was designed and are also characterized by the device upon which the application will finally run. An application may have more than one design to cater for unique experiences on the different devices where they have different capabilities. As such the screens representing a particular workflow may vary across device even for the same application (e.g. larger screens may permit richer more detailed information to be shown than on a smaller device and require a rather different UI design to accommodate that). Screens that might be separate on a smaller device might also be combined into a single screen (i.e., as one panel or multiple panels) on a larger device for the same logical workflow.

More specifically, FIG. 2A exemplarily depicts a screenshot showing the ability to search for workflow using text terms (tags) and/or search by Industry. In FIG. 2B, a designer is searching for a workflow relating to health care that would remind a patient about their medicine to make sure it was taken on time. Here the search found some workflows and they had been previously created in an application for care of the elderly (i.e., from the created database in step 105). As shown in FIG. 2C, if the designer is interested in more detail for any given screen in the workflow then a detailed view can be shown with the UI Elements and colors used therein as a palette. If the design is of interest it may be downloaded as either an image for reference in a new design or as a design file for more direct re-use.

Therefore, the method 100 may provide for a method/system for extracting mobile application workflow from design files by uploading a design file to a search engine and finding UI elements and collections as basic functions, generating, via the search engine, a flow graph of design screens found in the design file, wherein each of the design screens represent a state in the state machine, creating a transition graph that details how to move from each of the design screens to another, and analyzing, for each of the design screens, how relatable that screen is to any previously seen design screen and generating a tag that represents a workflow.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
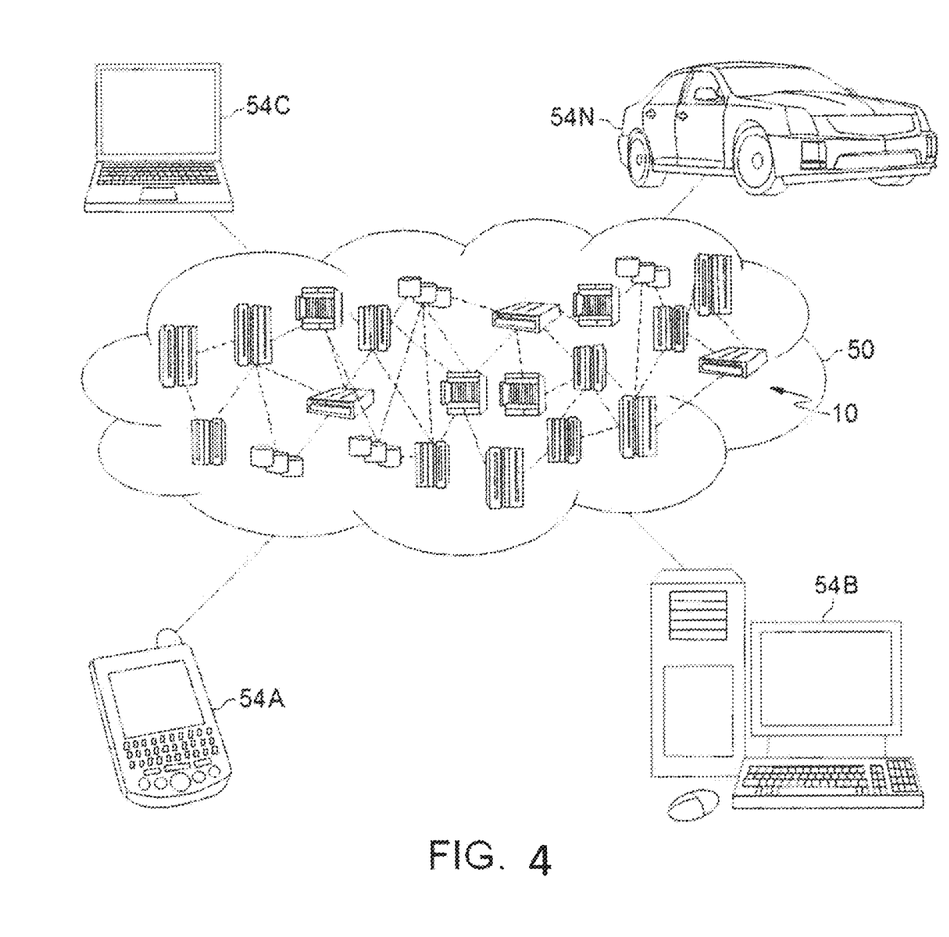
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
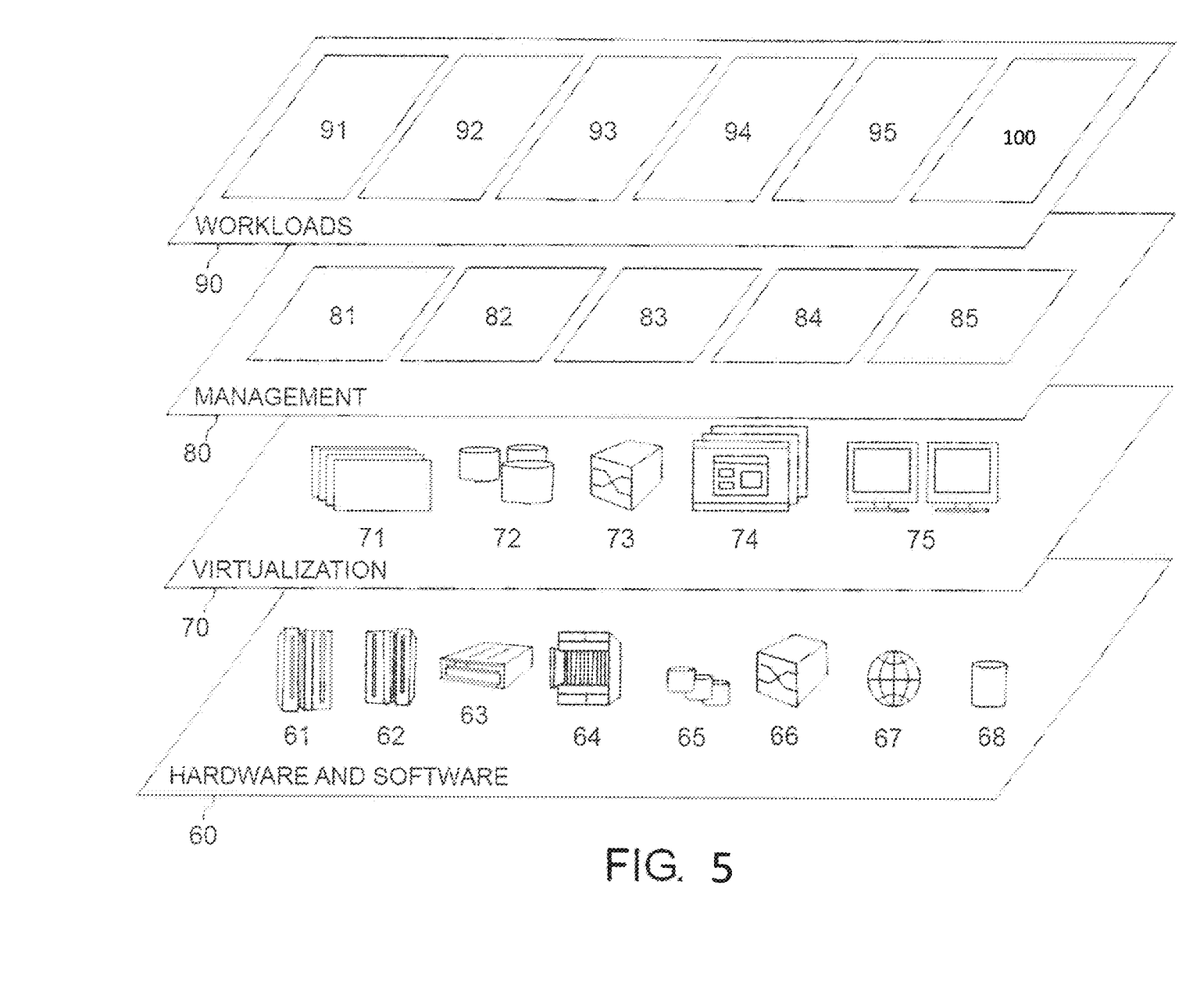
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow extraction method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented workflow extraction method, the method comprising:
   extracting functional elements from a design file to create a database of design screens;
   generating a flow graph of the design screens and the functional elements in the design file;
   creating a transition graph that details how to move from one of the design screens to another by analyzing a difference of the one of the design screens to the another of the design screens,
   the difference between the design screens being how to move from the one of the design screens to the another;
   analyzing, for each of the design screens, a relatability of one design screen to a previously analyzed design screen in the database and generating a tag that represents a workflow;
   creating a database linking the tag to a sequence of design screens from the transition graph; and
   receiving the tag from the database.

2. The computer-implemented method of claim 1, further comprising assigning a workflow tag representing a workflow based on each found path between the design screens.

3. The computer-implemented method of claim 1, wherein the analyzing determines a screen-relatable score between each design screen and the previously analyzed screen to determine a closeness of design screens.

4. The computer-implemented method of claim 3, wherein the screen-relatable score between each design screen and the previously analyzed screen is determined solely based on the functional elements of the design file.

5. The computer-implemented method of claim 1, wherein the functional elements include at least one of:
   a user interface (UI) element; and
   an interactive function.

6. The computer-implemented method of claim 1, wherein each of the design screens represent a state in a state machine.

7. The computer-implemented method of claim 1, embodied in a cloud-computing environment.

8. A workflow extraction system, said system comprising:
   a processor; and
   a memory, the memory storing instructions to cause the processor to perform:
      extracting functional elements from a design file to create a database of design screens;
      generating a flow graph of the design screens and the functional elements in the design file;
      creating a transition graph that details how to move from one of the design screens to another by analyzing a difference of the one of the design screens to the another of the design screens,
      the difference between the design screens being how to move from the one of the design screens to the another;
      analyzing, for each of the design screens, a relatability of one design screen to a previously analyzed design screen in the database and generating a tag that represents a workflow;
      creating a database linking the tag to a sequence of design screens from the transition graph; and
      receiving the tag from the database.

9. The system of claim 8, further comprising assigning a workflow tag representing a workflow based on each found path between the design screens.

10. The system of claim 8, wherein the analyzing determines a screen-relatable score between each design screen and the previously analyzed screen to determine a closeness of design screens.

11. The system of claim 10, wherein the screen-relatable score between each design screen and the previously analyzed screen is determined solely based on the functional elements of the design file.

12. The system of claim 8, wherein the functional elements include at least one of:
a user interface (UI) elements; and
an interactive function.

13. The system of claim 8, wherein each of the design screens represent a state in a state machine.

14. The system of claim 11, embodied in a cloud-computing environment.

15. A computer program product for workflow extraction, the computer program product comprising a computer-readable storage medium having program instructions embodied therewith, the program instructions executable by a computer to cause the computer to perform:
extracting functional elements from a design file to create a database of design screens;
generating a flow graph of the design screens and the functional elements in the design file;
creating a transition graph that details how to move from one of the design screens to another by analyzing a difference of the one of the design screens to the another of the design screens,
the difference between the design screens being how to move from the one of the design screens to the another;
analyzing, for each of the design screens, a relatability of one design screen to a previously analyzed design screen in the database and generating a tag that represents a workflow;
creating a database linking the tag to a sequence of design screens from the transition graph; and
receiving the tag from the database.

16. The computer program product of claim 15, further comprising assigning a workflow tag representing a workflow based on each found path between the design screens.

17. The computer program product of claim 15, wherein the analyzing determines a screen-relatable score between each design screen and the previously analyzed screen to determine a closeness of design screens.

* * * * *